United States Patent [19]

Lichtenhan et al.

[11] Patent Number: 5,484,867

[45] Date of Patent: Jan. 16, 1996

[54] PROCESS FOR PREPARATION OF POLYHEDRAL OLIGOMERIC SILSESQUIOXANES AND SYSTHESIS OF POLYMERS CONTAINING POLYHEDRAL OLIGOMERIC SILSESQIOXANE GROUP SEGMENTS

[75] Inventors: Joseph D. Lichtenhan, Palmdale; Jeffrey W. Gilman, Landcaster; Frank J. Feher, Costa Mesa, all of Calif.

[73] Assignees: The University of Dayton; The Regents of the University of California; The United States of America as represented by the Secretary of the Air Force, Washington, D.C.

[21] Appl. No.: 252,226

[22] Filed: Jun. 1, 1994

Related U.S. Application Data

[63] Continuation-in-part of Ser. No. 105,148, Aug. 12, 1993, Pat. No. 5,412,053.

[51] Int. Cl.$^6$ ................................................. C08G 77/06
[52] U.S. Cl. ................................ 528/9; 556/450; 556/455; 556/460; 528/37; 528/40; 528/15; 528/31; 528/32; 525/474; 526/249
[58] Field of Search .................................. 556/450, 455, 556/460; 528/9, 37, 40, 15, 31, 32, 474; 526/249

[56] References Cited

U.S. PATENT DOCUMENTS

| | | | |
|---|---|---|---|
| 2,465,188 | 3/1949 | Barry et al. | 260/448.2 |
| 3,294,737 | 12/1966 | Krantz | 528/40 |
| 4,349,609 | 9/1982 | Takeda et al. | 428/429 |
| 4,513,132 | 4/1985 | Shoji et al. | 528/21 |
| 4,745,169 | 5/1988 | Sugiyama et al. | 528/43 |
| 4,871,616 | 10/1989 | 8Kimura et al. | 428/407 |
| 5,039,771 | 8/1991 | Morimoto et al. | 528/14 |
| 5,043,789 | 8/1991 | Linde et al. | 357/52 |
| 5,047,472 | 9/1991 | Weidner et al. | 528/15 |
| 5,047,492 | 9/1991 | Weidner et al. | 528/15 |

OTHER PUBLICATIONS

Feher, et al. "Silsesquioxames as Models for Silica Surfaces" J. Am. Chemical Soc. 1989, 111, pp. 1741–1748.
Schildknecht, "Vinyl and Related Polymers" 1952. p. 515.
Laine et al, *Chem. Mat.*, (1990), V. 2:464–472.
Rahn et al, *Mat. Res. Soc. Symp. Proc.* (1990), V. 171:31–37.
Lichtenhan et al, "Silsesquioxane–Siloxane Copolymers from Polyhedral Silsesquioxanes," *Macromolecules*, 1993, 26 No. 8.
"Ladder and Spiro Polymers," *Concise Encyclopedia of Polymer Sci. & Eng.*, 1990, pp. 516–521.
Feher et al, "Enhanced Silylation Reactivity of a Model for Silica Surfaces," *J. Am. Chem Soc.*, 1990, 112, pp. 1931–1936.
Taylor et al, "The Preparation, Characteristics, and Use of Siloxanes as Precursors to Silicon Carbide," *Polymer Preprints*, vol. 32, 1991, pp. 586–587.

*Primary Examiner*—Robert E. Sellers
*Assistant Examiner*—Margaret W. Glass
*Attorney, Agent, or Firm*—Killworth, Gottman, Hagan & Schaeff

[57] ABSTRACT

A process for preparation of reactive polyhedral oligomeric silsesquioxanes and the subsequent synthesis of polysilsesquioxanes which produce high yield, tractable polymers containing silsesquioxane segments is provided. A trifunctional polyhedral oligomeric silsesquioxane of the formula $Si_7R_7O_9(OA)_3$ is corner capped by reacting it with a compound of the formula M–Z to form a polyhedral oligomeric silsesquioxane which can be reacted in various ways with oligomers, polymers, catalysts, or co-monomers to form polyhedral silsesquioxane polymers containing silsesquioxanes as pendant, block, or end group segments. The resulting polymers are essentially free of impurities and have controllable properties through the proper selection of the synthesis process and starting materials.

20 Claims, No Drawings

PROCESS FOR PREPARATION OF POLYHEDRAL OLIGOMERIC SILSESQUIOXANES AND SYSTHESIS OF POLYMERS CONTAINING POLYHEDRAL OLIGOMERIC SILSESQIOXANE GROUP SEGMENTS

GOVERNMENT RIGHTS

This invention was made with Government support under Contract No. F04611-88-C-0020 awarded by the Department of the Air Force. The Government has certain rights in the invention.

CROSS-REFERENCE TO RELATED APPLICATIONS

This application is a continuation-in-part of application Ser. No. 08/105,148, filed Aug. 12, 1993, now U.S. Pat. No. 5,412,053.

BACKGROUND OF THE INVENTION

The present invention relates to a process for the preparation of reactive polyhedral oligomeric silsesquioxane oligomers and to the subsequent synthesis of polymers containing segments of such polyhedral silsesquioxanes.

Polysilsesquioxanes exhibit a number of potentially useful properties including high temperature stability in air and good adhesion to a number of substrates. Polysilsesquioxanes are also resistant to oxidation and degradation by ultraviolet light. They may find use as protective coatings for electronic devices and other substrates and as precursors for ceramic coatings, foams, fibers, and articles. However, polysilsesquioxanes also are problematic in that prior art synthesis routes either have produced low yields of product or are complex. Further, the resulting polymers, because of their highly crosslinked nature, have been difficult to handle, purify, and characterize. Polysilsesquioxanes also exhibit a well-known propensity to form insoluble, intractable gels.

The prior art includes several methods of synthesizing silsesquioxane-based polymers, $(RSi(O)_{1.5})_x$. For example, Rahn et al, *Mat. Res. Soc. Symp. Proc.*, (1990) v. 171:31–37, teach producing a silsesquioxane copolymer through a catalytic redistribution reaction followed by a reaction with alcohols. Laine et al, *Chem. Mat.*, (1990), v. 2:464–472, teach the synthesis of methylsilsesquioxane polymers using a titanium-catalyzed redistribution of cyclomers or linear oligomers.

Sugiyama et al, U.S. Pat. No. 4,745,169, teach a polyorganosilsesquioxane polymer useful as a photoresist which is synthesized from a trichlorosilane or trialkoxysilane having a protected hydroxyl group. Kimura et al, U.S. Pat. No. 4,871,616, relate to a surface-treated polymethylsilsesquioxane powder used as an antiblocking agent. The polymer is formed by reacting a silicon compound with ammonia and water, allowing a hydrolysis/condensation reaction to occur, and then heating the resulting dispersion.

Linde et al, U.S. Pat. No. 5,043,789, describe a process for forming an insulating layer of a ladder-type silsesquioxane copolymer. The copolymer is synthesized by a condensation reaction with an aminoalkoxysilane and an arylalkoxysilane or arylsilazane monomer. Weidner et al, U.S. Pat. No. 5,047,492, describe several processes for the synthesis of organooligosilsesquioxanes using free radical addition and crosslinking reactions.

However, all of the prior art synthesis methods suffer from one or more of the following drawbacks. The synthesis routes used do not afford property control in the resulting polymer. The polymer quality and utility is limited due to impurities which arise from side reactions during synthesis. The synthesis route does not obtain a high yield, and/or the polymers produced have a limited shelf life because they contain reactive functionalities left over from the synthesis reaction. These drawbacks result either from the in situ formation of the silsesquioxane component or from the presence of multiple functionalities on the silsesquioxane.

Accordingly, the need still exists in the art for alternative synthesis processes for polysilsesquioxanes which produce high yield, tractable polymers which are essentially free of impurities and whose properties may be controlled by the particular method of synthesis and/or by selection of the appropriate starting materials.

SUMMARY OF THE INVENTION

The present invention meets those needs by providing synthesis processes for polysilsesquioxanes in which the silsesquioxane component of the polymers is formed in advance of the polymer synthesis. A compound having reactive siloxide functionalities is used to prepare a silsesquioxane oligomer, which in turn can be used to produce polymers containing silsesquioxanes as pendant, block, or terminal groups, by various grafting and polymerization reactions. The resulting polymers are essentially free of impurities and have controllable properties through the selection of the synthesis process and/or starting materials.

In accordance with one aspect of the present invention, a process for making a reactive silsesquioxane oligomer is provided which includes the steps of providing a trifunctional polyhedral oligomeric silsesquioxane of the formula $Si_7R_7O_9(OA)_3$, where OA is —OH, —OSb$(CH_3)_4$, —OSn$(CH_3)_3$ or —OTl, and R is an alkyl, alkenyl, aryl, or alkoxy group, and corner capping the trifunctional silsesquioxane by reacting it with a compound of the formula M–Z to form a polyhedral oligomeric silsesquioxane having the formula $Si_7R_7O_{12}M(Z)$, where R is an alkyl, alkenyl, aryl, or alkoxy group, M is a silane, siloxane, or organometallic group, and Z is a reactive group. The corner capping reaction proceeds by a condensation reaction between the hydroxyl or alkoxide groups on the silsesquioxane and the appropriate functionality (M) on the silane, siloxane, or organometallic group.

The reactive group Z is preferably selected from the group consisting of hydrides, esters, acids, acrylates, alkyl acrylates, alcohols, halides, substituted alkyl, alkenyl, or aryl groups, alpha-olefins, alpha-epoxides, and cyclic compounds which can undergo ring opening polymerization or ring opening metathesis polymerization.

In one embodiment of the invention, the corner capping step comprises reacting the trifunctional silsesquioxane starting material with an olefinic trichlorosilane in diethyl ether in the presence of triethylamine. In an alternative embodiment, the corner capping step comprises reacting the trifunctional silsesquioxane with a reagent containing leaving groups selected from the group consisting of amines, alkoxides, or alkyls.

It is possible to manipulate the Z functionality on the resulting polyhedral oligomeric silsesquioxane by employing a variety of substitution techniques. For example, the Z functionality may be converted to an alcohol where the reactive group Z is chloride, bromide, or iodide, by adding silver perchlorate to a solution of the polyhedral oligomeric silsesquioxane in aqueous acetone, and removing the acetone under reduced pressure after the reaction takes place.

In an alternative embodiment, the Z functionality may be manipulated by a corner capping reaction which includes sequentially reacting the trifunctional silsesquioxane with tetrachlorosilane, phosphinimine and an aldehyde to produce a polyhedral oligomeric silsesquioxane in which the reactive group Z contains a vinylic group.

In instances where M is a silane or siloxane, the reactive group Z is preferably selected from the group consisting of H, $(CH_2)_3OC(O)CHCH_2$, $(CH_2)_3OC(O)CCH_3CH_2$, $(CH_2)_2C_6H_4CH_2OC(O)CCH_3CH_2$, $(CH_2)_2C_6H_4CH_2OC(O)CHCH_2$, $CHCH_2$, $CH_2CHCH_2$, $(CH_2)_6CHCH_2$, $CH_2(CH_2)_8(CHCH_2)$, $(CH_2)_2C_6H_4CH_2OH$, and $CHC_6H_4OH$. Where M is an organometallic group such as titanium or zirconium, the reactive group Z is preferably selected from the group consisting of $C_5Me_4(CHCH_2)$, $OSi(CH_3)_2(CH_2)_3OC(O)CHCH_2$, and $OSi(CH_3)_2(CH_2)_3OC(O)CCH_3CH_2$.

The corner capping reaction of the trifunctional polyhedral oligomeric silsesquioxane results in a polyhedral oligomeric silsesquioxane which may be used in various synthesis processes to produce polyhedral silsesquioxane polymers.

One such process for the synthesis of polymers containing silsesquioxanes comprises the steps of providing a polyhedral oligomeric silsesquioxane of the formula $Si_7R_7O_{12}M(Z)$, where R is an alkyl, alkenyl, aryl, or alkoxy group, M is a silane, siloxane, or organometallic group, and Z is a reactive group, and reacting the polyhedral oligomeric silsesquioxane with an oligomer, polymer, reactive co-monomer, or catalyst to form a homopolymer or copolymer containing silsesquioxane groups.

The reactive group Z is preferably selected from the group consisting of hydrides, esters, acids, acrylates, alkyl acrylates, alcohols, halides, substituted alkyl, alkenyl, or aryl groups, alpha-olefins, alpha-epoxides, and cyclic compounds which can undergo ring opening polymerization or ring opening metathesis polymerization.

Where the polyhedral oligomeric silsesquioxane is reacted with a catalyst, a homopolymerization reaction occurs with the aid of small amounts of free radical initiators to form a polymer having the formula $OSi(CH_3)_2(CH_2)_3OC(O)CHCH_2$, and $OSi(CH_3)_2(CH_2)_3OC(O)CCH_3CH_2$.

where $R_8$ is an acrylate, alkyl acrylate, or olefin group, $MSi_7R_7O_{12}$ is the polyhedral oligomeric silsesquioxane described above, and n is a number which provides a weight average molecular weight for the polymer from about 5,000 to 250,000 or higher. Properties of the homopolymers produced by this synthesis method may be manipulated through copolymerization with other monomers or by blending with other common organic polymers including thermoplastic polymeric materials.

In an alternative embodiment, the polyhedral oligomeric silsesquioxane may be reacted with a co-monomer comprising a monomer containing acrylic or olefin groups, which results in a block polymer having the formula

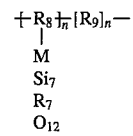

where $R_8$ and $R_9$ are selected from the group consisting of acrylates, alkyl acrylates, or olefins, $MSi_7R_7O_{12}$ is the polyhedral oligomeric silsesquioxane as described above, and n is a number which provides a weight average molecular weight for the polymer of from about 5,000 to 250,000 or higher.

In another embodiment of the invention, the polymer synthesis proceeds by a grafting reaction in which the polyhedral oligomeric silsesquioxane is reacted with a polymer having terminal vinyl or hydride groups in the presence of a hydrosilylation catalyst. The resulting polymer has the formula

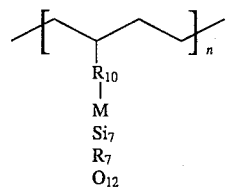

where $R_{10}$ is a vinyl or other olefinic group, $MSi_7R_7O_{12}$ is the polyhedral oligomeric silsesquioxane described above, and n is a number which provides a weight average molecular weight for the polymer of from about 5,000 to 500,000.

The polyhedral oligomeric silsesquioxane may also be reacted with an oligomer or polymer having vinyl or hydride end groups to form an ABA type block polymer. The reactive oligomer or polymer may be an organic polymer having groups such as alkyl, aryl, alkenyl, alkynyl, or ether groups, or it may be an inorganic polymer such as polysilane or polysiloxane. The resulting block polymer has the formula $[O_{12}R_7Si_7M]_n$—$[R_{11}]_m$—$[MSi_7R_7O_{12}]_n$ where $R_{11}$ is the reactive oligomer or polymer, $MSi_7R_7O_{12}$ is the polyhedral oligomeric silsesquioxane described above, and m and n are numbers which provide a weight average molecular weight for the polymer of from about 2,500 to 500,000.

In yet another embodiment of the invention, the process for the synthesis of polymers containing silsesquioxanes comprises the steps of providing a trifunctional polyhedral oligomeric silsesquioxane of the formula $Si_7R_7O_9(OA)_3$, where OA is —OH, —OSb$(CH_3)_4$, —OSn$(CH_3)_3$, or —OTl, and R is an alkyl, alkenyl, aryl, or alkoxy group and reacting the trifunctional silsesquioxane with an oligomer, polymer, or reagent by a corner capping reaction to form a graft copolymer containing polyhedral oligomeric silsesquioxane groups.

Where the trifunctional polyhedral oligomeric silsesquioxane is reacted with a reagent, the reagent preferably comprises trichlorosilane. The trifunctional silsesquioxane may also be reacted with an oligomer or polymer preferably containing trichlorosilane end groups. The polymer may be an organic polymer which includes alkyl, aryl, alkenyl, alkynyl, or ether groups. Alternatively, the polymer may be an inorganic polymer such as polysilane or polysiloxane.

The resulting polymer is a block polymer having the formula $[O_{12}R_7Si_7M]_n$—$[R_{11}]_m$—$[MSi_7R_7O_{12}]_n$ n where $R_{11}$ is the reactive organic or inorganic polymer, $MSi_7R_7O_{12}$ is the polyhedral oligomeric silsesquioxane described above, and m and n are numbers which provide a weight average molecular weight for the polymer of from about 2,500 to 500,000.

The properties of the polymers produced by the processes of the present invention may be controlled through (1) the molecular structure of the silsesquioxane starting material, (2) selection of appropriate R groups, (3) the nature of the reactive group Z, (4) the nature and composition of the main polymer chain, and (5) the number of graft points or blocks placed on the polymer. Thus, the polymers can be tailored to have desired properties. For example, the polymers may be designed to be elastomeric or brittle or possess adhesive properties or not. The polymers of the present invention may find use as thermal insulation, ablative materials, advanced composite resins, fibers, protective coatings, and biomedical materials. The polymers may also be used as ceramic precursors for the casting of ceramic parts and the production of ceramic foams, fibers, and matrix composites.

The silsesquioxane polymers also have the potential to be tailored to possess liquid crystalline properties either by using silsesquioxanes as rigid monomer segments, through the incorporation of mesogenic groups on the oligomeric silsesquioxanes, or by copolymerization of silsesquioxane oligomers with organic mesogens. The resulting polymer blends or liquid crystals may be used as silicon-based plastic coatings, structural materials, or for consumer products and packaging.

Accordingly, it is a feature of the present invention to provide a method for preparation of polyhedral oligomeric silsesquioxanes and synthesis processes for producing high yield, tractable polysilsesquioxanes which are essentially free of impurities and whose properties may be controlled. These, and other features and advantages of the present invention will become apparent from the following detailed description and the appended claims.

DETAILED DESCRIPTION OF THE PREFERRED EMBODIMENTS

The present invention utilizes as the starting material a trifunctional polyhedral oligomeric silsesquioxane prepared according to the methods taught by Feher et al, *J. Am. Chem. Soc.* (1989) v. 111: 1741–1748, and Feher et al, *J. Am. Chem. Soc.* (1990) v. 112: 1931–1936, the disclosures of which are hereby incorporated by reference. The trifunctional silsesquioxane has the formula $Si_7R_7O_9(OA)_3$, where OA is —OH, —OSb(CH_3)_4, or —OSn(CH_3)_3, and R is an alkyl, alkenyl, aryl, or alkoxy group, and is represented structurally as formula 1 below.

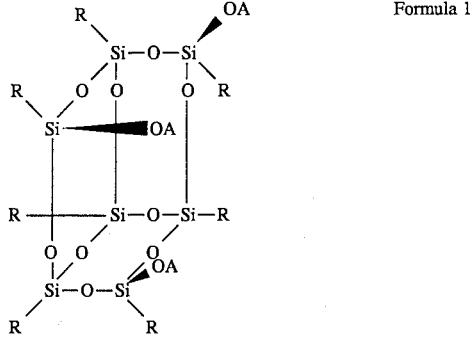

Formula 1

The R groups on the trifunctional silsesquioxane may generally be substituted or unsubstituted monovalent hydrocarbon groups having typically from 1 to 20 carbon atoms. Examples of alkyl or aryl groups include methyl, ethyl, propyl, butyl, hexyl, heptyl, octyl, and cyclohexyl groups. The R groups may also include alkenyl groups such as vinyl, allyl, hexenyl, heptenyl, and octenyl groups, and aryl groups such as phenyl groups. Alkoxy groups include the alkyl groups listed above linked by an oxygen.

The trifunctional polyhedral oligomeric silsesquioxane has a well-defined structure and contains three reactive siloxide functionalities. These siloxide functionalities may be varied from hydroxyl (OH) to stibonium ($OSb(CH_3)_4$), stannyl ($OSn(CH_3)_3$), and thallium (OTl) groups. As taught by Feher et al, the trifunctional polyhedral oligomeric silsesquioxane may be synthesized by a hydrolytic condensation of cyclohexyl trichlorosilane in aqueous acetone to provide the silsesquioxane of formula 1. Other substituted trichlorosilanes may be used to control the nature of the R groups which result on the silsesquioxane.

The stibonium group, —$OSb(CH_3)_4$, is attached to the trifunctional oligomeric silsesquioxane by reacting the silsesquioxanes of formula 1, where the OA groups are hydroxyl groups, with an excess of $Sb(CH_3)_5$ in benzene at 50°–60° C. for 2–4 hours. The stannyl group, —$OSn(CH_3)_3$, is attached to the trifunctional oligomeric silsesquioxane by reacting the silsesquioxanes of formula 1, where the OA groups are hydroxyl groups, with chlorotrimethylstannane in a tetrahydrofuran/triethylamine (95.5 v/v) solvent, or by reacting the stibonium derivative of formula 1 with chlorotrimethylstannane in benzene at 50°–60° C. for 2–4 hours. The thallium group (—OTl) is attached to the trifunctional oligomeric silsesquioxane by reacting the silsesquioxane of formula 1, where the OA groups are hydroxyl groups, with excess thallium ethoxide ($Tl(OCH_2CH_3)$) in benzene at room temperature for 2–4 hours.

Formula 1 is a useful starting material for the preparation of a number of polyhedral oligomeric silsesquioxanes which may subsequently be useful as polymerizable or graftable oligomers.

The preparation of such silsesquioxane oligomers is accomplished by corner capping formula 1 by reacting it with a compound of the formula. M–Z to form a polyhedral oligomeric silsesquioxane having the formula $Si_7R_7O_{12}M(Z)$, where M is a silane, siloxane, or organometallic group, and Z is a reactive group that will facilitate grafting or polymerization reactions. The polyhedral oligomeric silsesquioxane is represented structurally as formula 2 below.

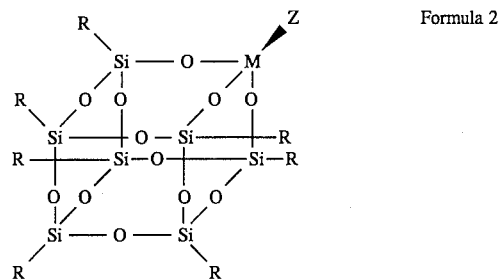

Formula 2

Several variations of Formula 2 may be prepared. For example, a variation of formula 2 where M is silane, and Z is —$(CH_2)_6CH=CH_2$ may be prepared by reacting formula 1 with 1-octenyltrichlorosilane in diethyl ether in the presence of 3.2 equivalents of triethylamine. The reaction is performed at room temperature for 12 hours and after filtration of the insoluble NHEt_3Cl, formula 2 may be collected as a white powder by evaporation of the solvent under reduced pressure. The reaction may also be performed using any other olefinic trichlorosilane such as allyl trichlorosilane or vinyl trichlorosilane.

Further variations of formula 2 may also be achieved by varying the compound M–Z. M may be a silane, siloxane, or an organometallic group such as titanium or zirconium. The reactive group Z is preferably selected from the group consisting of hydrides, esters, acids, acrylates, alkyl acrylates, alcohols, halides, substituted alkyl, alkenyl, or aryl groups, alpha-olefins, alpha-epoxide and cyclic compounds which can undergo ring opening polymerization or ring opening metathesis polymerization. Examples of Z groups include H, $(CH_2)_3OC(O)CHCH_2$, $(CH_2)_3OC(O)CCH_3CH_2$, $(CH_2)_2C_6H_4CH_2OC(O)CCH_3CH_2$, $(CH_2)_2C_6H_4CH_2OC(O)CHCH_2$, $CHCH_2$, $CH_2CHCH_2$, $(CH_2)_6CHCH_2$, $CH_2(CH_2)_8(CHCH_2)$, $(CH_2)_2C_6H_4CH_2OH$, and $CHC_6H_4OH$, $C_5Me_4(CHCH_2)$, $OSi(CH_3)_2(CH_2)_3OC(O)CHCH_2$, and $OSi(CH_3)_2(CH_2)_3OC(O)CCH_3CH_2$.

An example of a cyclic compound which can undergo a ring opening metathesis polymerization is norbornadiene, which forms polynorbornene on reaction with a catalyst. Similarly, cyclopropane undergoes ring opening polymerization upon reaction with a catalyst to form polypropane. Suitable catalysts for ring opening metathesis polymerizations include transition metal carbene complexes.

The Z functionality on formula 2 may be manipulated by using a variety of substitution techniques. For example, where the Z group of formula 2 contains a chloride, bromide, or iodide, the Z group may be converted to an alcohol by the addition of silver perchlorate to a solution of formula 2 in aqueous acetone. After reacting at room temperature for several hours, the product may be collected by filtration of the silver-halide and removal of acetone under reduced pressure.

Another method for manipulating the Z functionality of formula 2 includes the corner capping reaction of formula 1 with tetrachlorosilane to produce a reactive silyl-chloride functionality. This molecule is then reacted with two equivalents of a phosphinimine to produce a Wittig reagent having the formula $R_7T_7SiCHPR_3$. This molecule is then reacted with aldehydes via the loss of phosphine oxide to produce a polyhedral oligomeric silsesquioxane having the formula $O_{12}R_7TSiCH=CR^1R^2$ containing a vinylic group which is attached directly to the corner capped silicon atom of formula 2. Through variation of $R^{1,2}$ on the aldehyde reagent, a variety of reactive Z groups can be incorporated into this formula.

It should be appreciated that in cases where it is desirable to place highly reactive Z groups or specific functionalities such as amines or alcohols on formula 2, subsequent steps such as the addition or removal of protecting groups or substitutions as described above may be necessary in order to place the desired Z functionality on formula 2.

It should be noted that corner capping reactions of formula 1 may also be accomplished with the use of reagents containing non-halogenated leaving groups such as amines, alkoxides, or alkyls.

The synthesis of silsesquioxane polymers using formula 2 may be accomplished by a variety of different methods. For example, homopolymerization of silsesquioxane oligomers can be accomplished in common organic solvents with the aid of small amounts of free radical initiators or other catalysts. Suitable catalysts for radical polymerizations include azobisisobutyronitrile (AIBN) and organic peroxides such as Lupersol (trademark). For anionic polymerizations, metallized alkyl reagents such as methyl or butyl lithium may be used. For cationic polymerizations, Lewis acids such as aluminum chloride or boron trifluoride may be used. For metal initiated polymerizations, Ziegler-Natta catalysts may be used.

Copolymerizations of formula 2 with other monomers such as acrylates, alkyl acrylates, olefins, or polyolefins may be used to form polymers with varying compositions, properties and tacticities. For example, an "AB+ type block silsesquioxane polymer may be produced by homopolymer chain growth (A) to a desired length followed by the addition of a second monomer feed and subsequent polymerization until the desired (B) segment length is reached. This can be followed by subsequent re-additions and polymerizations. A variation of this procedure can be carried out by the addition of two or more silsesquioxane oligomers to a solution followed by polymerization to form a polymer containing silsesquioxane units in a random or ordered fashion.

Another method of producing silsesquioxane polymers is the use of grafting reactions in which the polyhedral oligomeric silsesquioxane is attached to a preformed polymer backbone-or chain. Grafting reactions are preferred where formula 2 contains only one functional point of attachment, such as when the reactive group Z is a hydride, chloride, or alcohol. For example, a grafting reaction of the polyhedral oligomeric silsesquioxane to a polymer with terminal vinyl groups may proceed in THF solution over the course of several hours in the presence of 1 mmol of a hydrosilylation catalyst such as a Karsted catalyst or a Speir catalyst such as hexachloroplatinic acid. Synthesis of silsesquioxane polymers from this reaction results from addition of the reactive silicon-hydrogen bond across the vinylic bond of the parent polymer.

A variation of the grafting reaction which also yields polymers having pendant silsesquioxane groups may be accomplished by reacting formula 1 with a reagent such as trichlorosilane. The reaction proceeds by a corner capping reaction.

Grafting reactions can also be used to produce ABA type block polymers. This method includes terminating the chain ends of an oligomer or polymer with reactive functionalities such as vinyl, hydride or trichlorosilane groups. These end groups may then be reacted with either formula 2 or with formula 1 such that silsesquioxanes are added to the polymer chain and to form an ABA triblock. This method can be used to prepare a variety of ABA triblock polymers in which the "B" segment can be either an organic polymer having alkyl, aryl, alkenyl, or ether groups, or an inorganic polymer such as a polysilane or polysiloxane. This method provides an advantage over previous synthesis methods because only one polyhedral oligomeric silsesquioxane needs to be attached at each end of a polymer in order to produce a polymer product with useful properties. This is because the molecular weight of formula 2 is so large (about 1000 amu) that a single silsesquioxane molecule (A) attached at the ends of a polymer (B) can function equivalently to a chain of much smaller molecules having an equivalent molecular weight. The polydispersity of the polyhedral oligomeric silsesquioxane group is about 1.0, which is narrower than that of an equivalently sized polymer chain, which is typically greater than 1.0. The polydispersity of the polyhedral oligomeric silsesquioxanes results in better control of the properties of the resulting polymers.

The polymers produced by the process of the present invention have enhanced thermal and oxidative stability, mechanical properties that range from hard to elastomeric plastics, high solubilities in common solvents, and an indefinite shelf life. These polymers may be processed into a variety of forms which include fibers, films, foams and monoliths.

The properties of the resulting polymers may be controlled through the manipulation of several variables. For example, the molecular structure of the silsesquioxane oligomer may be varied. The nature of the R groups on the silsesquioxane oligomer may be controlled by selection of the substituted trichlorosilanes used to form it, for example, cyclohexyl, cycloheptyl, cyclopentyl, phenyl, or methylphenyl groups may be used. The length and nature of the reactive group Z may also be varied, as well as the composition of the main polymer chain. The number of graft points or the number of blocks placed on the polymer chain may also be varied.

Changes in these variables may also affect polymer stereochemistry, thermal properties such as $T_g$ and $T_m$, and thermochemical properties such as char yield. Changes in these variables will also have an effect on the solubility of the resulting polymer in hydrocarbon solvents as well as thermochemical properties and polymer interchain interactions.

The blending of a polymer containing silsesquioxane groups with an organic or inorganic polymer can provide polymer blends which possess a range of desirable thermal and mechanical properties. Examples of inorganic polymers include polyphosphazines, polysiloxanes, polysilanes, polycarbosilanes and combinations thereof. Examples of organic polymers include nylons, carbonates, acrylates, imides, styryls, esters, ethers, dienes and combinations thereof. Examples of combinations of such organic polymers include engineering thermoplastics such as polyether block-amides, commercially available from Atochem under the designation PEBAX®, or block-styrene block-diene block-styrene, commercially available from Shell Oil Co. under the designation KRATON®. Blends of a polymer containing silsesquioxane groups with KRATON® block copolymers may be prepared by weighing both components into a reactor flask followed by the addition of solvent(s) in which the polymers are either soluble or they swell. The mixture may then be mixed with or without heating using a high shear emulsifier or other instrument designed to promote solution mixing or homogenization. After mixing, the solvents may be removed from the blended material by evaporation directly from the flask or from a mold. Solvent removal may also be aided through the use of a vacuum or by heating. Alternatively, the same procedure may be followed by melting the polymer with KRATON® block copolymers and mixing the two materials together in their molten states using shear mixing, kneading, or extrusion techniques.

The polymers of the present invention also have the potential to be provided with liquid crystalline properties by incorporating rigid polyhedral silsesquioxane macromers as rigid segments in block copolymers or as side-chain groups. Examples of crystalline or liquid crystalline organic polymers include aromatic polyamides, esters, benzobisoxazoles, polypeptides, and cellulosics. The overall rodlike nature of these materials is controllable by altering the amount and type of flexible segments in the polyhedral oligomeric silsesquioxane polymers. In addition, the incorporation of mesogenic groups either onto the silsesquioxane macromer or as linking groups between the silsesquioxane molecules may be used to enhance the ordering and rodlike nature of the resulting polymers, thus increasing their propensity to form liquid crystalline materials.

The resulting liquid crystallinity or interchain interaction and alignment of polymer chains results from the rigidity of the silsesquioxane molecules or from the presence of any organic mesogens present either as side groups on the silsesquioxane molecules or as main chain co-monomeric segments. Polyhedral oligomeric silsesquioxane polymers with liquid crystalline properties may be used as structural silicon-based plastics, optical wave guides and coatings, or as thermally, chemically and oxidatively stable polymer additives to plastics.

It should be appreciated that other variations of the chemical compositions, reactions, and synthesis methods may be used for the production of these silsesquioxane containing polymers provided that they have been derived from the polyhedral oligomeric silsesquioxanes disclosed herein.

In order that the invention may be more readily understood, reference is made to the following examples, which are intended to be illustrative of the invention, but are not intended to be limiting in scope.

EXAMPLE 1

A triblock polymer having the structure $O_{12}R_7Si_8(CH_2)_3$—$Si(CH_3)_2$—$(O$—$Si(CH_3)_2)_2$—$(CH_2)_3$—$Si_8R_7O_{12}$ was synthesized by charging a 50 ml flask with allyl functionalized $Si_8$ monomer (1.02 g., 0.98 mmol), hexamethyltrisiloxane disilane (0.133 g., 0.640 mmol) in 10 ml of freshly distilled $CH_2Cl_2$. To this solution 0.01 g. of a 3% platinum divinyl catalyst was added. The mixture was stirred and heated to reflux for 12 hours, then cooled to room temperature, and filtered through celite and charcoal. The volatiles were removed under vacuum. The remaining white solid was dried for 3 hours. 0.867 g., 77% of theoretical yield, of polymer was recovered. Spectroscopic analysis of the product was consistent with a polymer having the structure shown above.

$^1$H NMR ($CDCL_3$) 1.74 (br, 70H), 1.49 (br, 70H), 1.25 (br, 4H), 0.76 (br, 14H), 0.62 (b, 4H), 0.079 (br, 18H), 0.033 (br, 4H); $^{29}$Si NMR ($CDCL_3$) −68.77 (s, 7Si), −68.59 (s, 7Si), −66.68 (s, 2Si), −21.19 (s, 2Si), 6.88 (s, 2Si).

The polymers identified below as polymers 1a through 1c were prepared using the same reaction scheme and conditions as in Example 1. Several properties of the resulting polymers were measured and are listed in Table I below.

TABLE I

| Polym. | B Linkage | $M_n$ (K) | $M_w$ (K) | $T_m$ (°C.) |
|---|---|---|---|---|
| 1a | —$(CH_2)_3(OSi(CH_3)_2)_3(CH_2)_3$— | 2.29 | 2.29 | 290 |
| 1b | —$(CH_2)_8(OSi(CH_3)_2)_3(CH_2)_8$— | 2.48 | 2.48 | 258 |
| 1c | —$(CH_2)_2(OSi(CH_3)_2)_{118}OSi(Ph)_2)_2(CH_2)_2$— | 11.3 | 11.3 | 22.4 |

EXAMPLE 2

A polymer having the structure

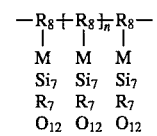

was synthesized by charging a 10 ml flask with methacrylate

R₇Si₈ monomer (0.5 g., 0.44 mmol) and 0.9 ml of freshly distilled toluene. 0.815 ml of a 1 mol % AIBN toluene solution was added to this solution. The mixture was heated with stirring to 60° C. for 6 days until the pale yellow color of the solution disappeared. The reaction was then cooled to room temperature and volatiles removed under reduced pressure. The resulting white solid was dissolved in 4 ml of toluene and precipitated into methanol (200 ml), collected by filtration and dried under vacuum for 3 hours. 0.46 g., 92% of theoretical yield of polymer was recovered. Spectroscopic analysis of the product was consistent with a polymer having the structure shown above.

$^1$H NMR (CDCL$_3$) 2.33 (s, 3), 1.69 (br, 37H), 1.20 (br, 37H), 0.73 (s, 7H), $^{29}$Si NMR (CDCL$_3$) −68.60 (s, 7Si), −67.05 (s, 1Si).

The polymers identified below as polymers 2a through 2b were prepared using the same reaction scheme and conditions as in Example 2. Several properties of the resulting polymers were measured and are listed in Table II below.

TABLE II

| Polym. | Z | Polym. Chain | $M_n$ (K) | $M_w$ (K) | $M_w/M_n$ | $T_g$ (°C.) | $T_m$ (°C.) | $T_{dec}$ (°C.) |
|---|---|---|---|---|---|---|---|---|
| 2a | —(CH$_2$)$_3$OC(O)— | —CH$_2$CCH$_3$— | 117.4 | 222.1 | 1.89 | 36 | — | 388 |
| 2b | —(CH$_2$)$_3$OC(O)— | —CH$_2$CCH$_3$— | — | — | — | 36 | — | 325 |

For the polymers produced from Examples 1 and 2, the number average molecular weights, $M_n$, ranged from 2.3 to 117. The weight average molecular weights, $M_w$, ranged from 2.3 to 222. The number average molecular weights and weight average molecular weights were determined by light scattering measurements using a gel permeation chromatograph (GPC) equipped with a DAWN-F™ detector (available from Wyatt Technologies, Santa Barbara, Calif.). All of the polymers exhibited indefinite thermal stabilities at temperatures below 300° C. Upon further heating, the polymers are converted to the corresponding Si(O)$_x$(C)$_y$ containing ceramic.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for making a reactive silsesquioxane oligomer comprising the steps of:

a) providing a trifunctional polyhedral oligomeric silsesquioxane of the formula Si$_7$R$_7$O$_9$(OA)$_3$, where OA is —OH, —OSb(CH$_3$)$_4$, —OSn(CH$_3$)$_3$, or —OTl, and R is an alkyl, alkenyl, aryl, or alkoxy group; and b) corner capping said trifunctional polyhedral silsesquioxane by reacting said trifunctional polyhedral silsesquioxane with a compound of the formula M–Z to form a polyhedral oligomeric silsesquioxane having the formula Si$_7$R$_7$O$_{12}$M(Z), where M is a silane, siloxane or organometallic group and Z is a reactive group selected from the group consisting of chloride, bromide or iodide, and wherein said process further includes the step of adding silver perchlorate to a solution of said polyhedral oligomeric silsesquioxane in aqueous acetone to convert said reactive group Z to an alcohol.

2. A process for making a reactive silsesquioxane oligomer comprising the steps of:

a) providing a trifunctional polyhedral oligomeric silsesquioxane of the formula Si$_7$R$_7$O$_9$(OA)$_3$, where OA is —OH, —OSb(CH$_3$)$_4$, —OSn(CH$_3$)$_3$, or —OTl, and R is an alkyl, alkenyl, aryl, or alkoxy group; and b) corner capping said trifunctional polyhedral silsesquioxane by sequentially reacting said trifunctional silsesquioxane with tetrachlorosilane, phosphinimine and an aldehyde to form a polyhedral silsesquioxane oligomer having the formula Si$_7$R$_7$O$_{12}$M(A) wherein M is a silane and Z contains a vinylic group.

3. A process for the synthesis of polymers containing silsesquioxanes, comprising the steps of:

a) providing a polyhedral oligomeric silsesquioxane of the formula Si$_7$R$_7$O$_{12}$M(Z), where R is an alkyl, alkenyl, aryl, or alkoxy group, M is a silane, siloxane or organometallic group, and Z is a reactive group selected form the group consisting of hydrides, esters, acids, acrylates, alcohols, amines, alkoxides, aldehydes, halides, halogen-substituted alkyl groups, halogen-substituted alkenyl groups, halogen-substituted aryl groups, alpha-epoxides, and cylic compounds which can undergo a ring opening polymerization or ring opening metathesis polymerization; and b) reacting said polyhedral oligomeric silsesquioxane at the site of said reactive Z group with an oligomer, polymer, reactive co-monomer, or catalyst to form a homopolymer or copolymer containing silsesquioxane groups.

4. The process of claim 3 wherein said reactive co-monomer comprises a monomer containing acrylic or olefin groups.

5. The process of claim 3 wherein said reactive group Z comprises hydride, and said polyhedral oligomeric silsesquioxane is reacted with a polymer having terminal vinyl groups in the presence of a hydrosilylation catalyst.

6. The process of claim 3 wherein said polyhedral oligomeric silsesquioxane is reacted with an oligomer or polymer having vinyl or hydride end groups.

7. The process of claim 6 wherein said polymer with which said polyhedral oligomeric silsesquioxane is reacted includes reactive groups selected from the group consisting of alkyl, aryl, alkenyl, alkynyl, and ether groups.

8. The process of claim 6 wherein said polymer with which said polyhedral oligomeric silsesquioxane is reacted is selected from the group consisting of polysilanes and polysiloxanes.

9. The process of claim 3 including the step of blending said homopolymer or copolymer with another thermoplastic polymeric material.

10. A process for the synthesis of polymers containing silsesquioxanes, comprising the steps of:

a) providing a trifunctional polyhedral oligomeric silsesquioxane of the formula Si$_7$R$_7$O$_9$(OA)$_3$, where OA is —OH, —OSb(CH$_3$)$_4$, —OSn(CH$_3$)$_3$, or —OTl, and R is an alkyl, alkenyl, aryl, or alkoxy group; and b) reacting said trifunctional silsesquioxane with an oligomer, polymer or monomeric reagent by a corner capping reaction to form a block or graft copolymer containing silsesquioxane groups.

11. The process of claim 10 wherein said trifunctional silsesquioxane is reacted with a trichlorosilane reagent.

12. The process of claim 10 wherein said trifunctional silsesquioxane is reacted with an oligomer or polymer containing trichlorosilane end groups.

13. The process of claim 12 wherein said polymer with which said trifunctional silsesquioxane is reacted includes alkyl, aryl, alkenyl, alkynyl, or ether groups.

14. The process of claim 12 wherein said polymer with which said trifunctional silsesquioxane is reacted is selected from the group consisting of polysilanes and polysiloxanes.

15. A compound of the formula $Si_7R_7O_{12}M(Z)$, where R is an alkyl, alkenyl, aryl or alkoxy group, M is a silane, siloxane, or organometallic group, and Z is a reactive group selected from the group consisting of $(CH_2)_3OC(O)CHCH_2$, $(CH_2)_3OC(O)CCH_3CH_2$, $(CH_2)_2C_6H_4CH_2OC(O)CCH_3CH_2$, $(CH_2)_2C_6H_4CH_2OC(O)CHCH_2$, $CHCH_2$, $CH_2CHCH_2$, $(CH_2)_6CHCH_2$, $CH_2(CH_2)_8(CHCH_2)$, $(CH_2)_2C_6H_4CH_2OH$, and $CH_2C_6H_4OH$.

16. A compound of the formula $Si_7R_7O_{12}M(Z)$, where R is an alkyl, alkenyl, aryl or alkoxy group, M is a silane, siloxane, or organometallic group, and Z is a reactive group selected from the group consisting of $C_5Me_4(CHCH_2)$, $OSi(CH_3)_2(CH_2)_3OC(O)CHCH_2$, and $OSi(CH_3)_2(CH_2)_3OC(O)CCH_3CH_2$.

17. A compound of the formula

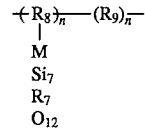

where $R_8$ is a reacted olefin group, and $MSi_7R_7O_{12}$ is a silsesquioxane, where M is a silane, siloxane, or organometallic group, R is an alkyl, alkenyl, aryl or alkoxy group and n is a number which provides a weight average molecular weight for the compound of from about 5,000 to 250,000.

18. A compound of the formula

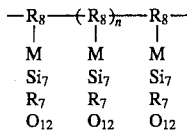

where $R_8$ is a reacted olefin group and $R_9$ is formed from a reacted co-monomer containing acrylic or olefin groups, and $MSi_7R_7O_{12}$ is a silsesquioxane, where M is a silane, siloxane, or organometallic group, R is an alkyl, alkenyl, aryl or alkoxy group and n is a number equal to or greater than 1 which provides a weight average molecular weight for said compound of from about 5,000 to 250,000.

19. A compound of the formula

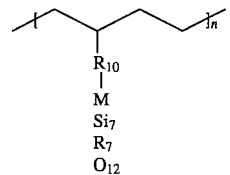

where ⌒⌒ is a polymer backbone, $R_{10}$ is formed form a reacted vinyl or olefinic group, and $MSi_7R_7O_{12}$ is a silsesquioxane, where M is a silane, siloxane, or organometallic group, R is an alkyl, alkenyl, aryl or alkoxy group, and n is a number equal to or greater than 1 which provides a weight average molecular weight for the compound of from about 5,000 to 500,000.

20. A compound of the formula $(O_{12}R_7Si_7M)_n$—$(R_{11})_m$—$(MSi_7R_7O_{12})_n$ where $R_{11}$ is a reacted oligomer or polymer, and $MSi_7R_7O_{12}$ is a silsesquioxane, where M is a silane, siloxane, or organometallic group, R is an alkyl, alkenyl, aryl or alkoxy group, and m and n are numbers which provide a weight average molecular weight for said compound of from about 2,500 to 500,000.

* * * * *